Patented Nov. 30, 1948

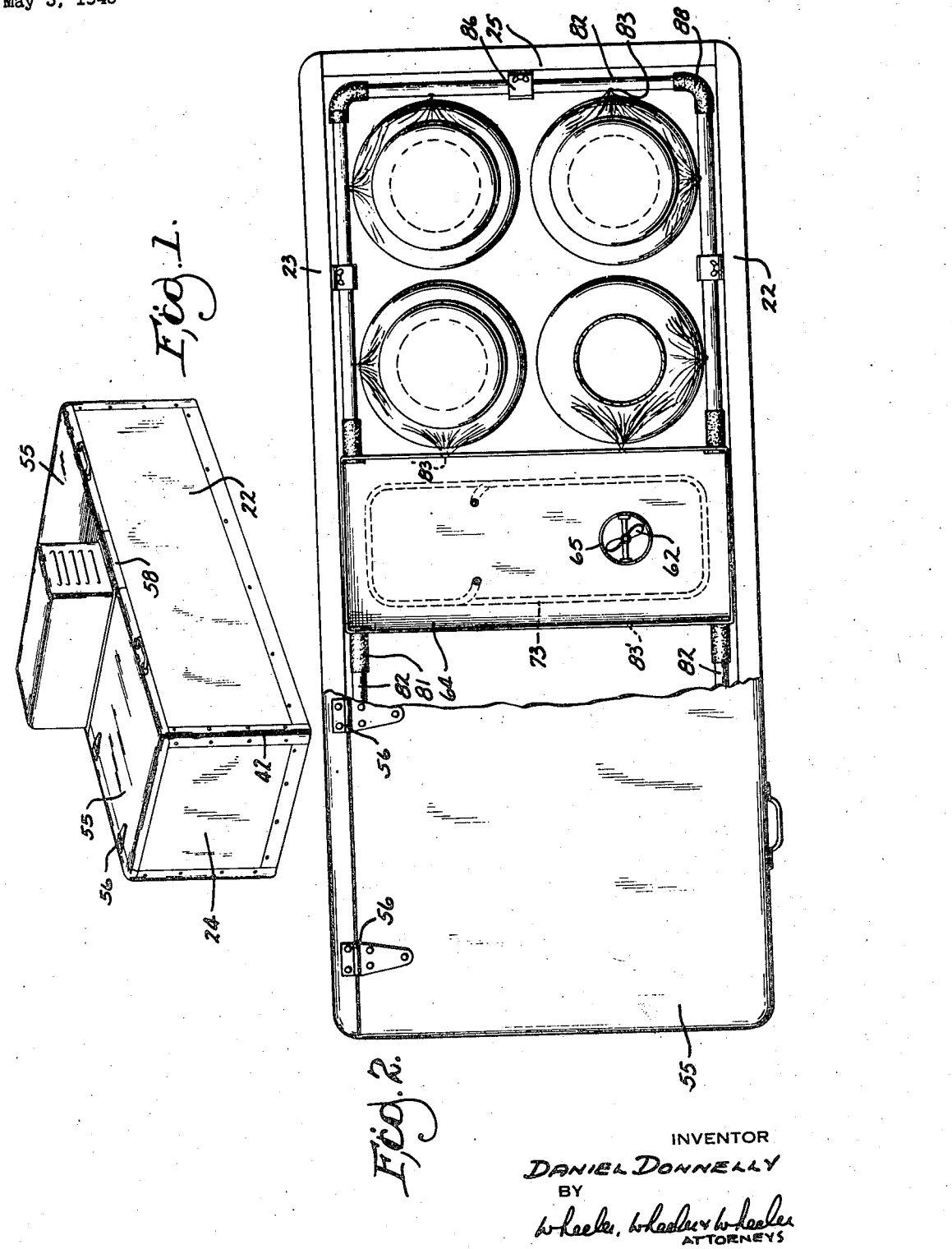

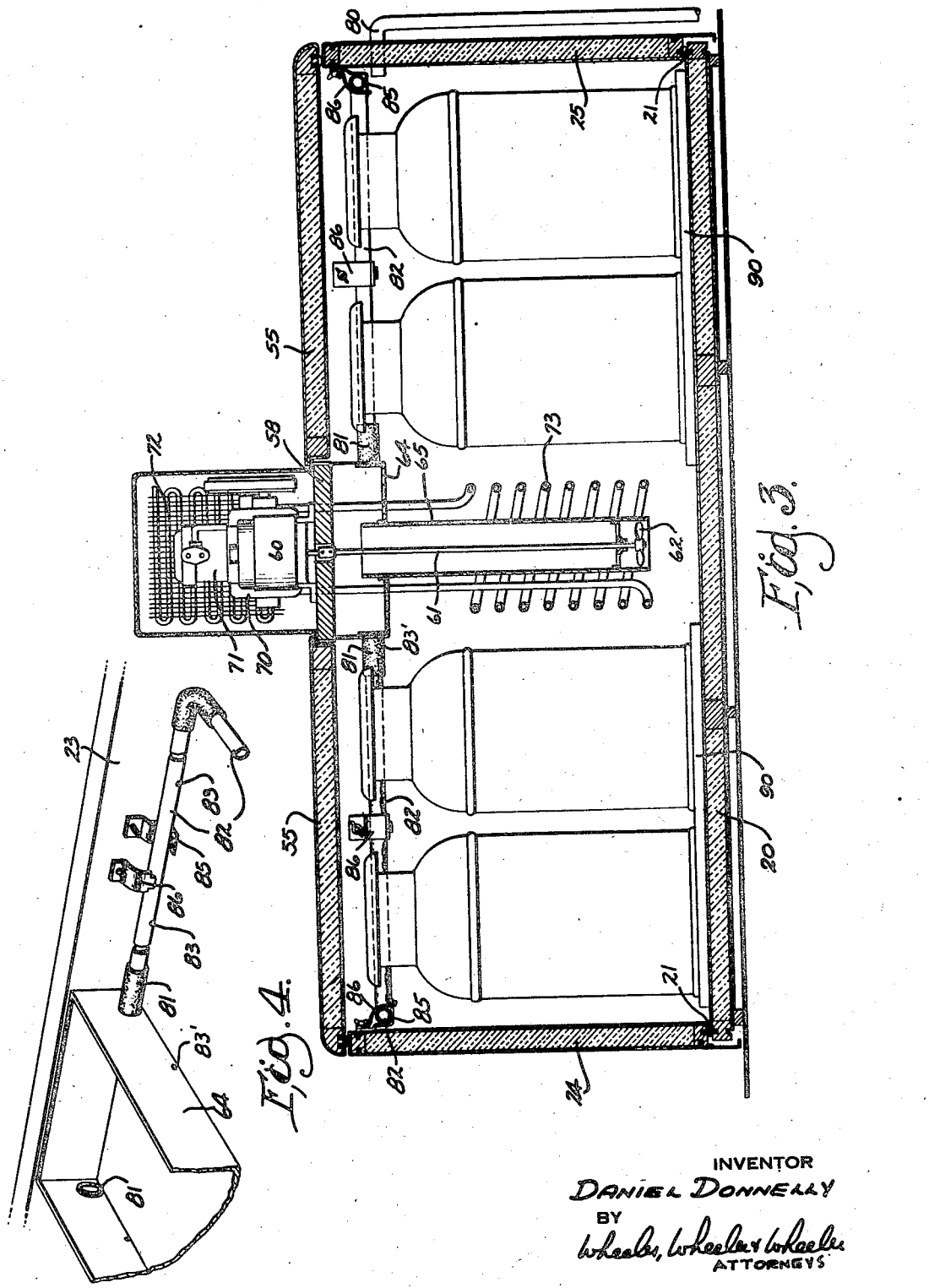

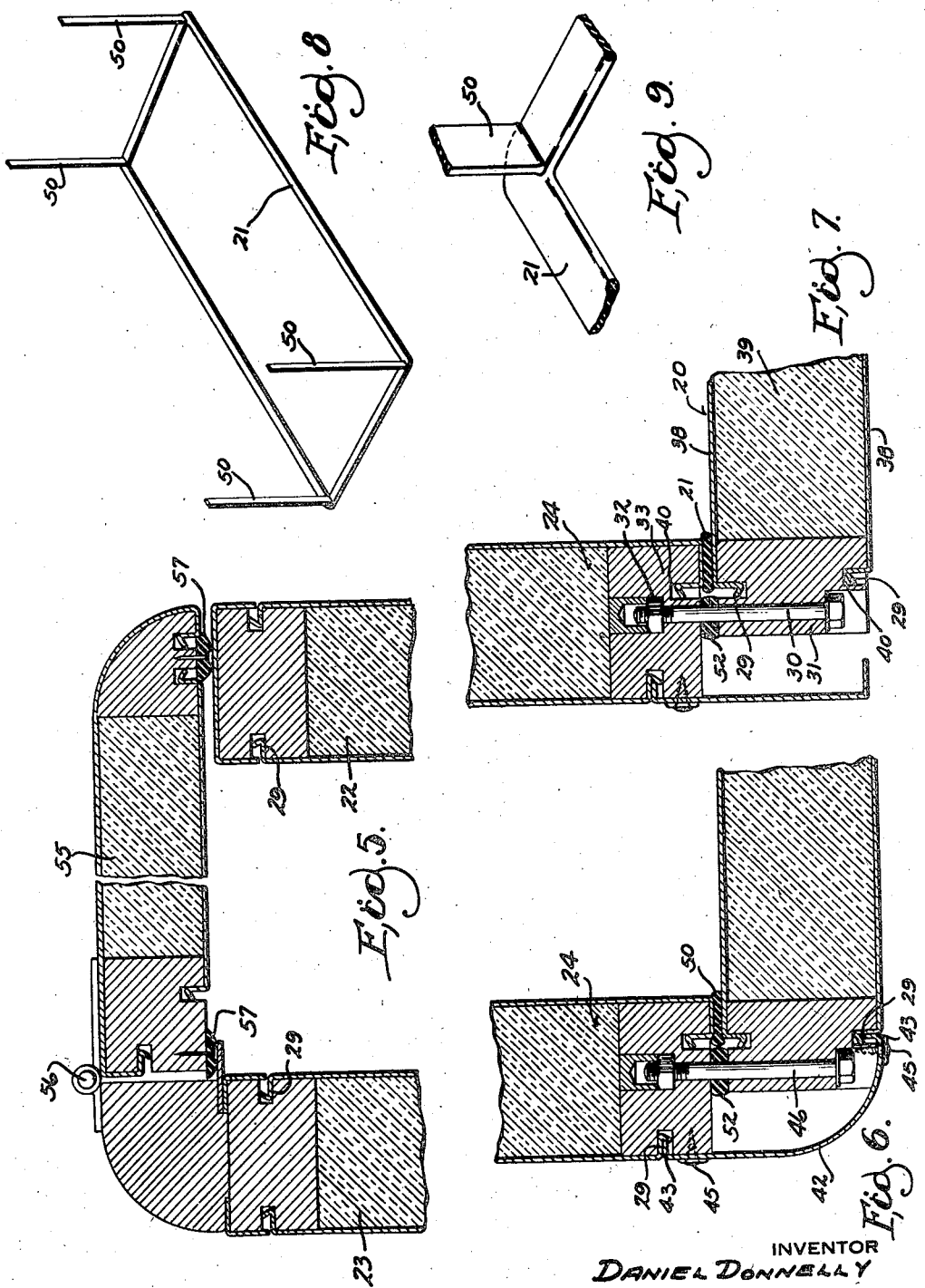

2,455,162

UNITED STATES PATENT OFFICE 2,455,162

SPRAY COOLING APPARATUS FOR MILK CANS

Daniel Donnelly, Milwaukee, Wis., assignor to Universal Milking Machine Company, Waukesha, Wis., a corporation of Wisconsin Application May 3, 1945, Serial No. 591,734

15 Claims. (Cl. 62—101)

My invention relates to improvements in milk coolers, with special reference to means for cooling milk in portable milk cans of ordinary type.

The quick chilling of freshly drawn milk has become increasingly recognized as necessary to prevent rapid multiplication of bacteria with which the milk becomes infected during the milking process. If the milk is immediately reduced to a very low temperature, bacterial generation becomes very slow and the milk suffers little impairment prior to pasteurization or delivery. But the ordinary dairy man has had no efficient means for reducing the temperature of freshly drawn milk other than tanks of cold well water in which the milk cans are set at varying depths—dependent upon the number of cans in the tank.

The object of my invention is to provide means for furnishing dairymen with factory made, inexpensive, knock-down receptacles for the reception of milk cans, which receptacles are so constructed that they may be readily assembled to form water-tight tanks provided with motor operated chilling units and water circulating means for quickly withdrawing heat units from milk cans with substantially equal efficiency regardless of varying water levels in the tanks.

A further object is to provide a water circulating system adapted to maintain a constant flow of water over the necks and other upper portions of the cans below their covers, whereby the milk in those portions of the cans which are not submerged in the chilling liquid may nevertheless be cooled with maximum possible efficiency.

A further object is to provide a water circulating and distributing system which can be shipped as separate parts, and these parts, together with the walls of the tank, quickly assembled and operated by persons having little knowledge of mechanics.

In the drawings:

Figure 1 is a perspective view of a milk cooler embodying my invention in its preferred form.

Figure 2 is a plan view of the same on an enlarged scale, with the motor housing and portions of the covers removed to expose the pan and some of its associated pipes for distributing the liquid refrigerant to the upper portions of the milk cans.

Figure 3 is a view in vertical section, drawn to a central vertical longitudinal plane.

Figure 4 is a detail view in perspective, showing a fragment of the distributing pan and some of its associated pipes.

Figure 5 is a view in vertical section, showing fragments of the upper portions of the front and back walls, and an associated cover.

Figure 6 is a horizontal sectional view, drawn through a corner fragment.

Figure 7 is a vertical sectional view, drawn through a fragment of the bottom and one of the ends.

Figure 8 is a perspective view of the packing strips in assembled relation to each other, but detached from their supporting walls.

Figure 9 is a greatly enlarged perspective, showing fragments of one corner portion of a bottom packing strip and an associated end wall packing, or gasket.

Like parts are identified by the same reference characters throughout the several views.

The receptacle of my improved milk cooler preferably comprises a bottom wall or base 20, provided with a continuous gasket 21 along the margin of its upper surface. Upon this gasket the lower margins of front, back and end walls 22, 23, 24 and 25 are respectively clamped in water-tight relation to the bottom by vertical bolts 30, as best shown in Figure 7. The heads of these bolts may be socketed in the marginal bars or rails 31 of the bottom wall, with nuts 32 received in sockets in the bottom bars or rails 33 of the vertical wall. Each of the walls, including the bottom wall, preferably comprises a wooden frame disposed between the margins of metal sheets 38, the space between these sheets and within the frame being filled with heat insulating material 39.

To facilitate assembly of the wall, the metal sheets 38 may be provided with elbowed hook-shaped extensions or flanges 29 along those margins which are abutted by other walls in the assembled relation, and such other walls may have channels 40 cut in the abutting frame bars 33 into which the hook-shaped flanges 29 may be entered in pressed-fit relation to the sides of the channels.

At the corners, the outer surfaces may be covered by curved corner plates 42 having margins 43 adapted to interlock with the hook-shaped margins of the associated flanges 29, as best shown in Figure 6. The corner plates may also be secured in place by screws 45 adapted to enter the wooden frame members of the associated wall.

The vertical walls have their respective corners connected with each other by bolts 46 in the same manner as above described with reference to the means for connecting those walls with the base by bolts 30, except that the bolts 46 extend horizontally.

The inner marginal portions of the vertical walls are provided with gaskets 50, each of which has its bottom end slightly extended for pressure contact with the base gasket 21. The vertical bolts 30 and the horizontal bolts 46 are each provided with resilient washers 52, whereby the various walls may be drawn into yielding pressure contact with the respective gaskets.

The covers 55 are preferably hinged to the back wall, as indicated at 56, and these covers are provided with resilient cushions or gaskets 57. Intermediate of the covers 55, a solid top plate 58 may connect the front and back walls and provide a support for a pump and a chilling unit hereinafter described. The structure of the covers 55 is similar to that of the vertical walls, being composed of framing covered with metal sheeting and filled with insulating material.

Platform 58 supports a pump operating motor 60 and a depending pump rod 61 and water circulating pump 62. Said plate is also provided with a depending distributing pan 64, provided with an opening through which a depending pump tube 65 extends and encloses the pump shaft 61 and pump 62.

Platform 58 also supports a chilling unit of ordinary type, including a motor 70, compressor 71 and a condenser 72 connected with an expansion coil 73 encircling the pump tube 65, whereby liquid in the tank may be chilled. The chilling unit may be of any ordinary type, and further detailed description thereof is deemed unnecessary.

The distributing pan 64 is suitably apertured near its respective corners and provided with short lengths of rubber tubing 81, each filling one of the apertures and projecting in a position to receive a length of distributing pipe 82 provided with apertures 83 suitably located for delivery of jets of water against the neck portions of milk cans partially submerged in the tank.

A series of these distributing pipes 82 extends along the upper portions of the walls of the tank and the pipes are supported therefrom at intervals by suitable brackets 85 and 86. At the corners, the pipes 82 are connected by elbowed rubber sleeves 88 into which the ends of the pipes may be telescoped when assembling the structure in position for use.

With the above described construction the walls of the tank may be shipped in knock-down form to the place of use, together with the pump, motors, chilling unit, and pan 64, preferably in factory assembled relation to each other and accompanied by the necessary number of detached distributing pipes 72 and their rubber connections. By thus delivering the parts in knock-down form, shipping charges may be reduced to a minimum, and all of the parts quickly assembled at the place of use, regardless of the mechanical experience of the persons making such assembly.

One end wall of the tank may be provided with an overflow pipe 80, but ordinarily the tank will be only partially filled with water to such a level that when milk cans to the limit of its capacity are inserted, the water level will be substantially at the top of the overflow pipe. Therefore, at the beginning of a milking operation, the water level in the tank may be only of sufficient depth to submerge the bottom portion of the first can placed therein. But the chilling unit being in operation, a starting of the pump motor will not only circulate the liquid about the submerged portion of the can but will also elevate a portion thereof to the distributing pan and cause it to flow through the distributing pipes to apertures properly located for delivering the chilled liquid to the upper portions of the can or cans below the level of the can covers. Preferably the pipes will be adjusted to bring the pipe apertures into positions for tangential delivery to the neck portions of the cans, and the number of pipe apertures and pipes may be multiplied to distribute the liquid over any desired portions of those upper surfaces.

While I have illustrated a tank to receive eight milk cans, it will be obvious that the knock-down wall units may be made of any desired size and shape so that tanks may be assembled in various sizes and to accommodate any desired number of milk cans.

The milk cans are supported above the metal bottom of the tank by platforms 90, preferably composed of slats as shown in Figure 3.

I claim:

1. A cooler for chilling freshly drawn milk in cans, comprising the combination with a milk can receiving, heat insulated liquid containing tank, of a motor driven chilling unit mounted on the tank and including expansion coils in the tank below the normal level of the liquid therein, a distributing pan supported from the walls of the tank above the maximum level of the liquid therein, a motor driven pump having connections for supplying liquid to the pan from the lower portion of the tank, and flexibly jointed pipe connections for gravity delivery of liquid from the pan to the neck portions of milk cans in the tank.

2. A cooler for chilling freshly drawn milk in cans, comprising the combination of a can receiving, liquid containing, heat insulated tank, a distributing pan mounted in the upper portion of the tank, means for chilling the liquid in the tank, a motor driven pump for delivering the chilled liquid to said pan, and liquid conveying connections leading from the pan to the can receiving portions of the tank and having outlets in positions for liquid delivery to the neck portions of the cans.

3. The combination with a heat insulated liquid containing tank, adapted to receive receptacles to be chilled, of means for chilling liquid in the tank, a pump for circulating the liquid about the lower portions of such receptacles, and a distributing pan in the upper portion of the tank having flexibly jointed pipe outlets for delivering liquid to upper surfaces of the receptacles, said pump having an outlet duct connected with the pan for delivery of liquid thereto from the lower portion of the tank.

4. The combination with a heat insulated liquid containing tank, adapted to receive receptacles to be chilled, of means for chilling liquid in the tank, a pump for circulating the liquid about the lower portions of such receptacles, and connections leading from the pump outlet to portions of the receptacles above the level of the liquid in the tank, said connections including an elevated distributing pan provided with outlet pipes adapted to discharge liquid from the pan over upper portions of the receptacles.

5. A cooler of the described class, comprising the combination with a heat insulated liquid containing tank adapted to receive receptacles to be chilled in at least one portion of the tank, a hinged cover for said portion, a platform covering another portion of the tank, a distributing pan suspended from the platform in the upper portion of the tank, a pump carried by said platform and adapted to deliver liquid from the lower portion of the tank to said pan, and distributing pipe connections leading from the pan to predetermined portions of the tank underneath said hinged cover.

6. In a cooler of the described class, the combination of a set of impervious heat insulated walls adapted to be assembled to form a liquid containing tank, a platform adapted to cover one portion of the tank, a chilling unit, a pump and a suspended distributing pan carried by the platform in factory pre-assembled relation to each other, and separable pipe connections adapted to be connected with the pan at the place of use for gravity delivery of liquid to selected portions of the tank, said pump being adapted to deliver liquid from the bottom portion of the tank to said pan.

7. In a cooler of the described class, the combination of a set of heat insulated walls adapted, when assembled, to form a liquid retaining tank for varying numbers of milk cans, with consequent variations in the level of the tank liquid, a platform adapted to be detachably mounted on one portion of the tank and having in factory-assembled relation a distributing pan secured to the under surface of the platform and provided with an open-ended depending tube having its lower end near the bottom of the tank and its upper end portion extending through the bottom of the pan for delivering liquid thereto, a propeller-shaped pump in the lower portion of said tube, a refrigerating coil encircling said tube, a chilling unit mounted on the platform and operatively connected with said coil, a pump motor carried by the platform and operatively connected with said pump, and means for distributing liquid from the pan to the upper portions of the milk cans in the tank below their covers.

8. The combination with a knock-down tank having heat insulating walls adapted, when assembled, to enclose a refrigerating liquid and varying numbers of milk cans to be chilled, of a detachable platform for one portion of the tank having a pump motor, pump, liquid distributing means and a chilling unit including an expansion coil, all carried by the platform in factory-assembled relation, said pump and expansion coil depending from the platform for submersion in the tank liquid when the parts are assembled, and said distributing means being adapted to deliver pumped liquid to the upper surfaces of milk cans in the tank below their covers.

9. The combination set forth in claim 8, in which the tank has an impervious base plate marginally provided with a gasket strip, impervious side and end wall frame members engageable with said gasket strip, clamping bolts connecting the side and end wall frame members with the base in sealing relation to said gasket, and means for sealing the margins of said side and end walls to each other to form a watertight tank.

10. The combination set forth in claim 8, in which the wall members are provided with outer metal sheathings and heat insulating fillings between the sheathing and lining members.

11. The combination set forth in claim 8, in which the side and end wall members have linings outfolded and marginally interlocked with their associated frame members, and provided with packing gaskets for sealing the joints between the side and end wall linings upon assembly of the tank.

12. The combination with a knock-down milk cooling tank having heat insulating walls adapted, when assembled, to enclose a refrigerating liquid and varying numbers of milk cans to be chilled, of a set of heat insulating covers adapted to be applied to the can receiving portions of the tank, a detachable platform adapted to cover an intermediate portion of the tank between the milk can covers, a distributing pan secured to the under surface of the platform and provided with a depending open-ended tube, a chilling unit carried by the platform and having an expansion coil encircling said tube, a pump motor and pump also carried by the platform and adapted to deliver liquid through said tube into the distributing pan, said platform and the parts carried thereby being transportable as a unit with the knock-down portions of the tank to the place of use, and adapted, when assembled, to chill and elevate liquid from the lower portions of the tank to the upper portions of milk cans therein substantially as described.

13. A chilling and circulating assembly for elevating and circulating liquid in milk can cooling tanks, comprising a platform adapted to rest on top of the tank, a chilling unit and a pump motor mounted on the platform, a liquid receiving and distributing pan depending from the platform, an expansion coil of the chilling unit suspended with an associated pump below said pan, said pump supporting pipe connections leading to said pan, said chilling unit, pump motor, pump and its pipe connections and pan being transportable in factory-assembled relation to the platform, together with flexibly jointed pipe connections for distributing cooling liquid from the pan to the upper surfaces of varying members of milk cans in a tank upon which said platform is mounted.

14. A factory-assembled combination for cooling cans of milk in a liquid holding tank, comprising a platform adapted to be mounted on such tank as a portion of a cover therefor and provided with a depending pan, means associated with the platform for chilling liquid in the tank on which the platform is mounted and pumping means, including pipe connections for elevating the chilled liquid to the pan for distribution to exposed surfaces of cans in the tank.

15. In a cooler of the described class, the combination of a liquid containing tank adapted to receive milk cans in varying numbers with consequent variation in the level of the tank liquid, of means for continuously chilling the tank liquid, a motor driven pump having a suction inlet near the tank bottom and having an outlet near the tank top, a distributing pan receiving the liquid discharged from the pump outlet, and multiple flexibly joined pipes connected with the pan and extending at approximately the level of the neck portions thereof for distributing chilling liquid in free flowing streams over the surfaces of the cans in the tank and above the level of the liquid therein.

DANIEL DONNELLY.

REFERENCES CITED

The following references are of record in the file of this patent:

UNITED STATES PATENTS

| Number | Name | Date |
|---|---|---|
| 1,749,337 | Geyer | Mar. 4, 1930 |
| 2,031,274 | McKay | Feb. 18, 1936 |
| 2,101,261 | Martin | Dec. 6, 1937 |
| 2,150,682 | Hauser | Mar. 14, 1939 |
| 2,155,144 | Morse | Apr. 18, 1939 |
| 2,253,882 | Achs | Aug. 26, 1941 |